Patented Apr. 2, 1946

2,397,580

UNITED STATES PATENT OFFICE 2,397,580

RECOVERY OF VALUABLE HYDROCARBONS

Alger L. Ward, Drexel Hill, Pa., assignor to The United Gas Improvement Company, a corporation of Pennsylvania No Drawing. Application June 28, 1940,
Serial No. 342,910

6 Claims. (Cl. 260—666)

This invention pertains generally to the recovery of isoprene and piperylene from mixtures containing isoprene, piperylene and cyclopentadiene, and pertains particularly to the recovery of isoprene and piperylene from such mixtures when derived from light oil.

Isoprene, piperylene and cyclopentadiene have boiling points of 34° C., 43° C., and 40° C., respectively and, therefore, present a very difficult problem from the standpoint of separation by distillation quite apart from the fact that these substances are unstable or highly reactive upon the application of heat which is necessarily involved in any distillation process.

For example, the literature on the subject indicates that isoprene, piperylene and cyclopentadiene are each individually convertible to its respective dimer and higher polymers upon the application of heat. Such reactions might be termed homo-polymerization, since monomers of the same chemical structure are involved.

When these three substances, namely, isoprene, piperylene, and cyclopentadiene occur in mixtures, one would normally also expect reactions between monomers of different chemical structure, such reactions being termed co-polymerization.

Thus it might be expected that molecules of cyclopentadiene would react not only with other molecules of cyclopentadiene but also with molecules of isoprene and piperylene, both individually and in combination. Likewise, it might be expected that molecules of isoprene would react not only with other molecules of isoprene but also with molecules of piperylene. What has just been said with respect to isoprene applies in the same manner to piperylene.

Aside from the above considerations, the problem in the case of light oil fractions is further complicated by the presence of other $C_5$ hydrocarbons.

In addition to the three above mentioned dienes, there are twelve known hydrocarbons (2 paraffines, 5 olefines, 3 saturated cyclics, and 2 unsaturated cyclics) boiling in the range of 28° C. to 44° C.

Although I do not infer that all twelve of these other hydrocarbons are normally present in a light oil fraction, at least several may be detected.

I have discovered in the case of light oil fractions containing isoprene, piperylene and cyclopentadiene that the other hydrocarbons are individually present in sufficiently small quantities to permit separation of the isoprene and piperylene in highly concentrated fractions by distillation provided at least substantially all of the cyclopentadiene is first removed.

As described and claimed in my copending application, Serial Number 170,508, filed October 22, 1937 which has matured into Patent 2,211,038 dated August 13, 1940, the cyclopentadiene occurring in a mixture of cyclopentadiene, isoprene and piperylene, for example, in a light oil fraction, may be selectively dimerized to dicyclopentadiene upon the application of heat and superatmospheric pressure, leaving the isoprene and piperylene for the most part in the original monomeric state.

The monomeric material in the mixture resulting from the foregoing treatment may be separated by distillation, since the dimers and any other higher polymers formed as a result of the treatment are of considerably higher boiling point.

Should any significant quantity of residual monomeric cyclopentadiene remain in the mixture of separated monomeric material, it may be removed by dimerization by repeating the process of my above mentioned copending application followed by distillation.

I find that relatively small quantities of cyclopentadiene in the monomeric mixture do not greatly interfere with the subsequent separation of isoprene and piperylene from each other.

Having separated the cyclopentadiene from the monomeric mixture of isoprene and piperylene, the latter compounds may be separated from each other by distillation. This is extremely difficult, if not impossible, in the presence of any substantial quantity of cyclopentadiene and is a feature upon which this invention is based.

Therefore, in accordance with this invention a mixture of isoprene, piperylene and cyclopentadiene is subjected to elevated temperature and superatmospheric pressure, preferably in the substantial absence of oxygen to avoid any possible oxygenation, to selectively dimerize the cyclopentadiene. This is followed by distillation to separate the monomeric material which may be re-treated if necessary or desirable to remove any significant quantity of residual cyclopentadiene.

The resulting monomeric mixture which is at least substantially free from cyclopentadiene is then subjected to fractional distillation to separate the isoprene and piperylene from each other.

My process is particularly useful when applied to light oil fractions obtained by distillation and containing the above mentioned three diolefines, since there is also present a substantial quantity of other materials both saturated and unsaturated.

For example, a typical light oil fraction derived from light oil produced in the manufacture of combustible gas in which petroleum oil was cracked upon analysis was found to contain 36% isoprene, 18% piperylene, 23% olefines which were preponderately pentenes, 5% pentanes, and 18% cyclopentadiene. Incidentally, it will be noted that practically all of the foregoing are hydrocarbons containing 5 carbon atoms which accounts for their similarity in boiling point. The boiling range of the foregoing fraction was approximately from 28° C. to 45° C.

Suitable temperatures for the initial dimerization of cyclopentadiene lie between 40° C. and 170° C. with from 80° C. to 120° C. and more especially 90° C. to 110° C. as a very suitable secondary temperature range intermediate of which lies 100° C. which is especially suitable.

The time of treatment may be varied considerably depending upon the results desired. I find that when treating light oil fractions containing at least preponderately hydrocarbons of five carbon atoms, the treating time may conveniently vary from 3 to 24 hours depending upon the temperature employed. For example, for temperatures in the neighborhood of 80° C., 24 hours is more suitable to the substantially complete removal of cyclopentadiene, whereas for temperatures in the neighborhood of 120° C., 3 hours is more suitable for such substantially complete removal. For intermediate temperatures, intermediate times of treatment are suggested.

At any given temperature the time selected is, of course, preferably the minimum that will give the desired percentage removal of cyclopentadiene since any additional heating serves chiefly to increase the loss in isoprene and piperylene by polymerization. From the standpoint of yields intermediate temperatures with intermediate treating times are preferred to low temperatures with long treating times or high temperatures with short treating times.

In any event, if found necessary or desirable, a second treatment may be resorted to to remove residual cyclopentadiene.

The superatmospheric pressure employed should preferably be sufficient to maintain the mixture at least preponderately in the liquid phase and may be applied in any desired manner, as for example, by the use of a closed container, such as an autoclave, during the heating step.

The vapor pressures developed in a closed container holding any substantial quantity of the material undergoing treatment are sufficient at the temperatures employed to develop the superatmospheric pressure necessary to maintain substantially all of the material undergoing treatment in the liquid phase.

The result of the foregoing step is the dimerization of the cyclopentadiene.

The monomeric material may now be separated from the dicyclopentadiene and other polymeric material by distillation at any suitable pressure, for example, atmospheric or sub-atmospheric, or both, and the dimerization step may be repeated to remove residual cyclopentadiene from the monomeric material if found necessary or desirable.

The monomeric material substantially free from cyclopentadiene is now subjected to fractional distillation at any suitable pressure, for example, atmospheric to obtain fractions of isoprene and piperylene each of which may if desired be for the most part substantially free from the other of the two components while containing, depending upon the degree of concentration, quantities of pentenes and/or pentanes.

The presence of pentenes and/or pentanes in these fractions is permissible since the compounds of each class are much less reactive and as a general rule do not take part in polymerization reactions and are, therefore, not incompatible with many uses to which fractions of isoprene and piperylene may be put.

While there is some loss by dimerization of isoprene and piperylene in the initial step, I find that this may be held to a relatively low figure.

The entire process comprises three steps, namely (1) dimerization of cyclopentadiene, (2) separation of monomeric material from dimeric and other polymeric material, and (3) separation of isoprene and piperylene individually from the monomeric material. When these three steps are carried out consecutively and batchwise, a still-pot may be conveniently employed for dimerizing the cyclopentadiene in step (1) by providing a valve or other device of similar function between the still-pot and the column proper. During the dimerization of step (1) the valve is kept closed. When step (1) is completed the pressure in the still is reduced by cooling its contents to a point suitable for the separation of monomeric material, for example, approximately atmospheric. The valve is then opened and the steps (2) and (3) follow in a manner as already described above.

Instead of placing the valve in the vapor line from the still to the column proper, the valve might be placed in the vapor line leading from the top of the column to the condenser.

Although for purposes of simplicity in description, the foregoing three steps have been described as being performed separately, it is to be understood that any two or more of the foregoing steps might be carried out simultaneously.

For example, steps (1) and (2) may be carried out simultaneously by subjecting the original monomeric mixture to fractional distillation under pressure with a sufficiently high reflux ratio (which may or may not be maintained constant as the treatment proceeds) to yield a product which is substantially free from cyclopentadiene.

In this type of treatment the cyclopentadiene is subjected to dimerizing conditions under pressure not only in the still but also in the column.

Dicyclopentadiene as formed in the column remains preponderately in the liquid phase because its boiling point is approximately 130° C. higher than that of the monomeric material present. Thus, dicyclopentadiene as formed flows downwardly through the column and collects in the still-pot.

By regulation of the reflux ratio, any desired percentage including substantially all of the cyclopentadiene may be thus removed from the original monomeric mixture.

Since the dimerization of cyclopentadiene is a reversible reaction, the speed of which to the left may become significant at temperatures above, say 140° C., the treatment is preferably so conducted that temperatures in the still-pot do not greatly exceed this figure.

It will be understood that this type of treatment may be carried out either in batch or continuously.

Likewise, step (2) which comprises the separation of monomeric material from dimeric and other polymeric material, and step (3) which comprises the separation of isoprene and piperylene individually into fractions, may be carried out simultaneously. This may be accomplished by charging the mixture of monomeric, dimeric and other polymeric material to the still of a fractionating column and conducting the distillation in a manner to fractionally separate the isoprene and piperylene in the monomeric material after its separation from the dimeric and other polymeric material.

This type of separation may also be carried out conveniently either in batch or continuously.

For a given starting material and assuming the same degree of completion of step 1, the concentration (purity) of the isoprene and piperylene depend upon the fractionating efficiency available for step 3.

By employing a column of a sufficiently large number of theoretically perfect plates, for example 30 to 50 or more, say up to 100, and a sufficiently high reflux ratio, and operating either batch-wise or continuously, it is possible to combine steps (1), (2) and (3) into a single operation. In this case, the monomeric material after being separated in the tower from cyclopentadiene through dimerization of the latter as already more particularly described, is further fractionated into fractions containing preponderately isoprene and piperylene respectively.

Again, the separation may be carried out either batch-wise or continuously.

In the former case (i. e. batch distillation) it will be understood that unless the distillation is first operated under total reflux the first material taken overhead may contain some cyclopentadiene that has not yet polymerized. The quantity depends upon the efficiency of the column, the reflux ratio and the amount of material originally present boiling substantially below cyclopentadiene. In some cases, it is desirable that the forerunnings be recharged to the next operation. Similar considerations hold where steps 1 and 2 are carried out simultaneously and step 3 separately.

In the case of continuous distillation it may be desirable to provide a soaking chamber for heating the charge prior to feeding into the column.

Also the use of two columns connected in series is preferred. They may be arranged and operated in two ways.

In arrangement A the dimeric and polymeric material is taken off at the bottom of the first column, and a mixture of isoprene and piperylene at the top. The mixture of isoprene and piperylene taken off at the top of the first column is separated in the second column.

Alternatively, in arrangement B, the isoprene is taken off as the overhead in the first column, the bottoms being a mixture of piperylene and dimeric and polymeric materials. The piperylene is separated from the bottoms in the second column.

Arrangement B is generally preferred particularly if the first column is relatively much more efficient than the second. This is because the separation of isoprene and piperylene is many times more difficult than the separation of piperylene from the dimeric and polymeric materials and, therefore, requires the more efficient column which means a longer time of contact. It is desirable to provide this time of contact for the simultaneous polymerization of the cyclopentadiene.

It will be recalled that in separating monomeric material from dimeric and other polymeric material, pot temperatures are preferably maintained sufficiently low, such as below 140° C., to avoid any substantial conversion of dicyclopentadiene back to cyclopentadiene.

Thus, if it is desired to remove the last vestiges of monomeric material from the dimeric and other polymeric material this may be done, particularly in a batch process, under vacuum in order not to carry pot temperatures above a desired figure.

It will be understood that the dimerization of cyclopentadiene in step (1) may be carried out in part by one of the procedures more particularly described above and in part by another.

For example, a part of the cyclopentadiene may be dimerized by distilling the original monomeric mixture in a column under pressure and after separation of monomeric material the rest of the cyclopentadiene in the monomeric material may be dimerized under pressure in a closed container such as a still-pot. If a still-pot is employed as suggested, this might be followed by cooling to the desired pressure and then connecting the still to its column for performing step (2) or steps (2) and (3) as already described.

Other variations will occur from time to time to persons skilled in the art upon becoming familiar herewith.

The following examples will serve to further illustrate the invention.

*Example 1*

A light oil fraction was heated in a closed vessel for 24 hours at approximately 100° C.

This fraction prior to treatment contained 10.9% $C_6$ hydrocarbons, 87.1% $C_5$ hydrocarbons and 2% $C_4$ hydrocarbons. The 87.1% of $C_5$ hydrocarbons may be broken down as follows: isoprene 30.8%, piperylene 13.5%, cyclopentadiene 21.2%, pentenes 18.6%, and pentanes 3.0% to make the total of 87.1%.

After the foregoing treatment the monomeric material was separated from dimers and higher polymers by distillation.

The separated monomeric material was found to contain approximately 0.7% cyclopentadiene and was retreated by heating in a closed vessel under super-atmospheric pressure for 24 hours at 100° C. This was followed by distillation to separate the monomeric material from dimers and higher polymers.

The resulting monomeric mixture which was found to be substantially free from cyclopentadiene was subjected to fractional distillation whereby fractions of isoprene and piperylene substantially free from each other and from cyclopentadiene were obtained. Thus a cut containing 76.5% isoprene and substanially free from other diolefines and a cut containing 79.4% of piperylene and substantially free from other diolefines were produced.

As previously stated, due to the highly reactive nature of the diolefines, the presence of other materials which comprise pentenes and pentanes has hardly more than a diluting effect, and these fractions are suitable for many uses to which the 100% pure materials might be put.

In the foregoing treatment the total loss of isoprene plus piperylene by conversion to dimers and higher polymers was less than 14%.

*Example 2*

Light oil the preponderate portion of which boiled below 150° C. was subjected to fractional distillation under pressure of 70 pounds per square inch gauge to obtain a rough C₅ cut containing approximately 14.9% C₄ hydrocarbons, 76.7% C₅ hydrocarbons, and 8.4% C₆ hydrocarbons.

The result of the foregoing distillation under substantial pressure was to dimerize about 80% of the cyclopentadiene originally present. As a result the 76.7% of C₅ hydrocarbons in this cut had approximately the following breakdown: isoprene 39.7%, piperylene 13.4%, cyclopentadiene 5.0%, pentenes 13.6%, and pentanes 5.0% to make the total of 76.7%.

A quantity of benzene was added to this cut to later facilitate the separation of C₅ hydrocarbons and particularly piperylene from the dimers and higher polymers formed during the selective dimerization step, a description of which follows.

This cut was charged to a still-pot provided with a valve between it and its fractionating column, which valve was closed and the charge heated at a temperature of 80° C. to 85° C. for 12 hours, the still-pot being kept completely closed during the heating so as to maintain substantially all of the charge in the liquid phase as a result of the super-atmospheric pressure thus developed.

After the heating the still-pot was cooled sufficiently to reduce the pressure therein to substantially atmospheric whereupon the valve between the pot and the column was opened. This was followed by fractionation.

During this fractionation the benzene previously added together with the C₆ hydrocarbons already present provided material boiling higher than the C₅ hydrocarbons for filling the column in both the liquid and vapor phases to drive off from the column substantially all of the piperylene. This is, of course, an expedient to increase the yield, which may or may not be employed.

As a result of this latter distillation two isoprene cuts, both substantially free from piperylene and containing 65.3% and 81.7% isoprene with only 0.50% and 0.93% of cyclopentadiene respectively were obtained.

A piperylene cut substantially free from isoprene and containing 88.9% piperylene and only 1.30% cyclopentadiene was obtained.

Thus, isoprene and piperylene fractions each substantially free from the other were obtained in concentrations between 80% and 90% with a cyclopentadiene content of less than 1.5% from an original mixture containing approximately 21% cyclopentadiene, 30% isoprene and 11% piperylene. The total loss of isoprene plus piperylene was less than 3.5%.

If desired, the cyclopentadiene content of the isoprene and piperylene fractions thus obtained might be reduced in either of two ways, or both.

One way is to employ a more drastic dimerization treatment prior to distillation, for instance, as was done in Example 1 to remove last vestiges of cyclopentadiene; and the other is to subject the isoprene or piperylene fraction as the case may be, to heating under super-atmospheric pressure to dimerize the cyclopentadiene contained therein, followed by distillation.

While in the foregoing examples, isoprene and piperylene were individually recovered in fractions of given concentrations, it is to be understood that the concentration of the individual diolefine in such fractions might be varied considerably and might be either higher or lower as desired, or depending upon the efficiency of the fractionating equipment employed, and such fractions might or might not contain a small quantity of other diolefine which, if desired, may be reduced to relative insignificance.

From a commercial point of view the loss of isoprene and piperylene though small, by conversion to dimers or higher polymers will necessarily be a consideration in determining the final concentrations.

It is to be noted, however, that in the foregoing examples relatively high individual concentrations of isoprene and piperylene were obtained without an inordinately high loss by conversion to dimers and higher polymers.

It is to be understood that the foregoing particular description is by way of illustration and that many variations will suggest themselves to persons skilled in the art upon becoming familiar herewith.

Therefore, changes, omissions, additions, substitutions, and/or modifications might be made within the scope of the claims without departing from the spirit of the invention.

I claim:

1. A process for selectively separating cyclopentadiene from a mixture containing cyclopentadiene, isoprene and piperylene which comprises subjecting said mixture to fractional distillation under superatmospheric pressure sufficient to maintain still pot temperatures between 80° C. and 140° C. and under a sufficiently high reflux ratio to keep cyclopentadiene of said mixture in process for a sufficient length of time to be selectively converted to dicyclopentadiene, said reflux ratio also being sufficiently high to separate remaining monomeric material as distillate from said dicyclopentadiene as bottoms.

2. A process for selectively separating cyclopentadiene from isoprene and piperylene and for separating isoprene and piperylene from each other which comprises subjecting said cyclopentadiene, isoprene and piperylene to fractional distillation under superatmospheric pressure sufficiently to maintain still pot temperatures between 80° C. and 140° C. in a column having at least 30 theoretically perfect plates, and maintaining the reflux ratio sufficiently high to selectively convert substantially all of said cyclopentadiene to dicyclopentadiene, to separate isoprene and piperylene as vapors from said dicyclopentadiene as bottoms and to separate isoprene and piperylene from each other as distillates.

3. A process for selectively separating cyclopentadiene from a mixture containing cyclopentadiene, isoprene and piperylene which comprises subjecting said mixture to fractional distillation under superatmospheric pressure sufficient to maintain still pot temperatures between 80° C. and 140° C. with a sufficiently high reflux ratio to selectively convert cyclopentadiene to dicyclopentadiene and to separate isoprene as distillate from said dicyclopentadiene and piperylene as bottoms.

4. A process for selectively separating cyclopentadiene, isoprene and piperylene from a light oil fraction containing cyclopentadiene, isoprene and piperylene which comprises subjecting said fraction to fractional distillation under superatmospheric pressure sufficient to maintain still pot temperatures between 80° C. and 140° C. to selectively convert cyclopentadiene to dicyclopentadiene, said selective dimerization of said cyclopentadiene being with sufficient reflux to reduce said cyclopentadiene to a proportion negligible for the separation of said isoprene and piperylene from each other by fractional distillation, also maintaining said reflux ratio sufficient to separate a mixture of isoprene and piperylene as distillate from said dicyclopentadiene as bottoms, and separating said isoprene and piperylene from each other by distillation.

5. A process for selectively separating cyclopentadiene, isoprene and piperylene from a light oil fraction containing cyclopentadiene, isoprene and piperylene which comprises subjecting said fraction to fractional distillation under superatmospheric pressure sufficient to maintain still pot temperatures between 80° C. and 140° C. to selectively convert cyclopentadiene to dicyclopentadiene, said selective dimerization of said cyclopentadiene being with sufficient reflux to reduce said cyclopentadiene to a proportion negligible for the separation of said isoprene and piperylene from each other by fractional distillation, also maintaining said reflux ratio sufficiently high to separate isoprene as distillate from said dicyclopentadiene and piperylene as bottoms, and subjecting said bottoms to fractional distillation to separate piperylene as distillate from said dicyclopentadiene as bottoms.

6. In a process for the separation from each other of the three relatively highly heat sensitive conjugated diene hydrocarbons of closely similar and successively increasing boiling points isoprene, cyclopentadiene and piperylene contained in a mixture of said compounds, the steps of subjecting said mixture to fractional distillation conditions under sufficient superatmospheric pressure to maintain still pot temperatures between 80° C. and 140° C. to selectively dimerize to dicyclopentadiene the cyclopentadiene component of said mixture, said selective dimerization of said cyclopentadiene being with sufficient reflux to reduce said cyclopentadiene to a proportion negligible for the separation of said isoprene and piperylene from each other by fractional distillation, and separating unconverted diene hydrocarbon material including isoprene as distillate from said dicyclopentadiene as bottoms.

ALGER L. WARD.